Aug. 14, 1934.                A. DAHLSTROM                1,970,417
                          AUTOMATIC PHONOGRAPH
                         Filed Aug. 17, 1929          9 Sheets-Sheet 1
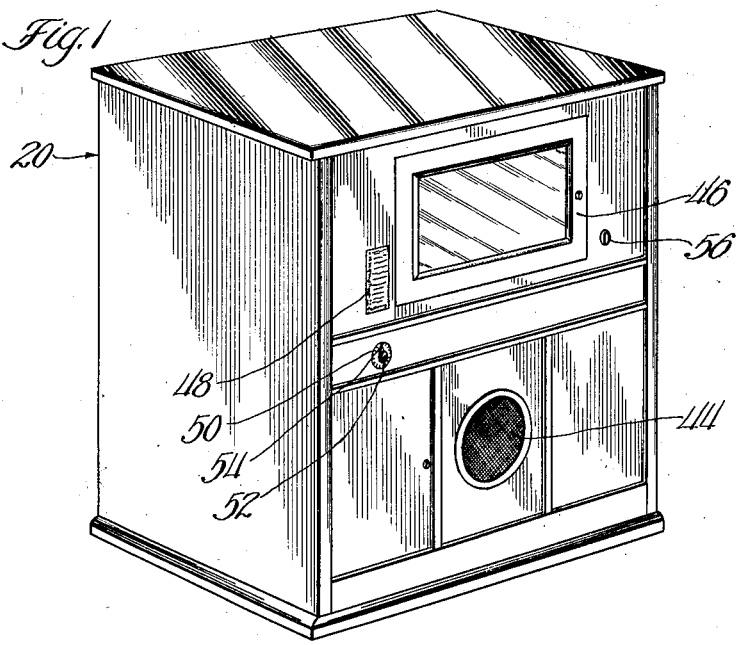
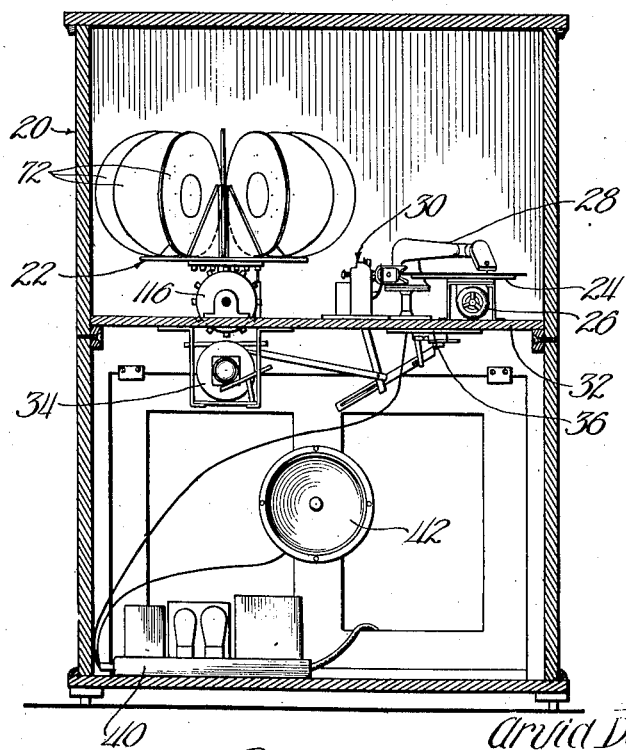
Inventor:
Arvid Dahlstrom
By Williams, Bradbury, McCaleb & Hinkle Attys.

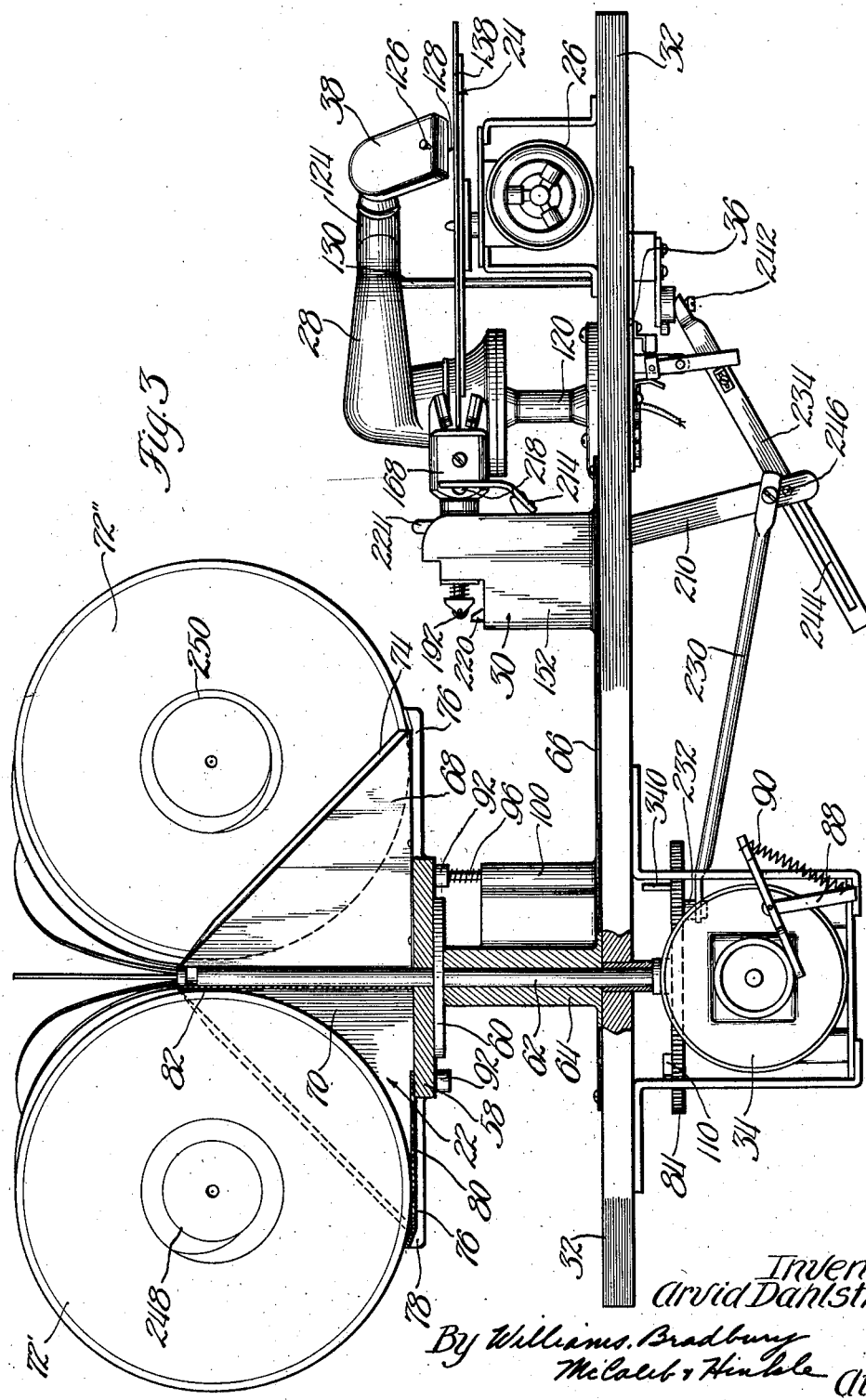

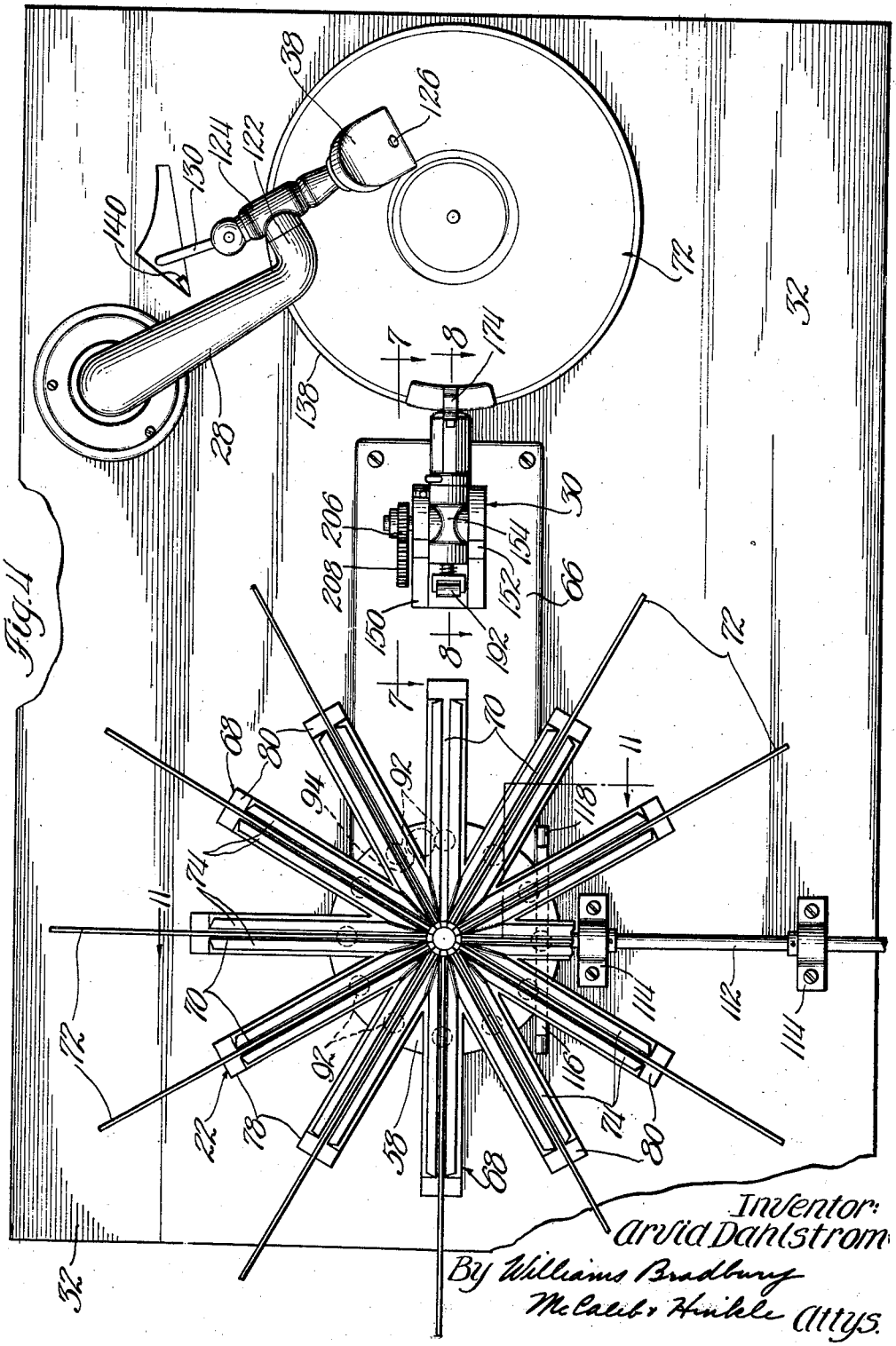

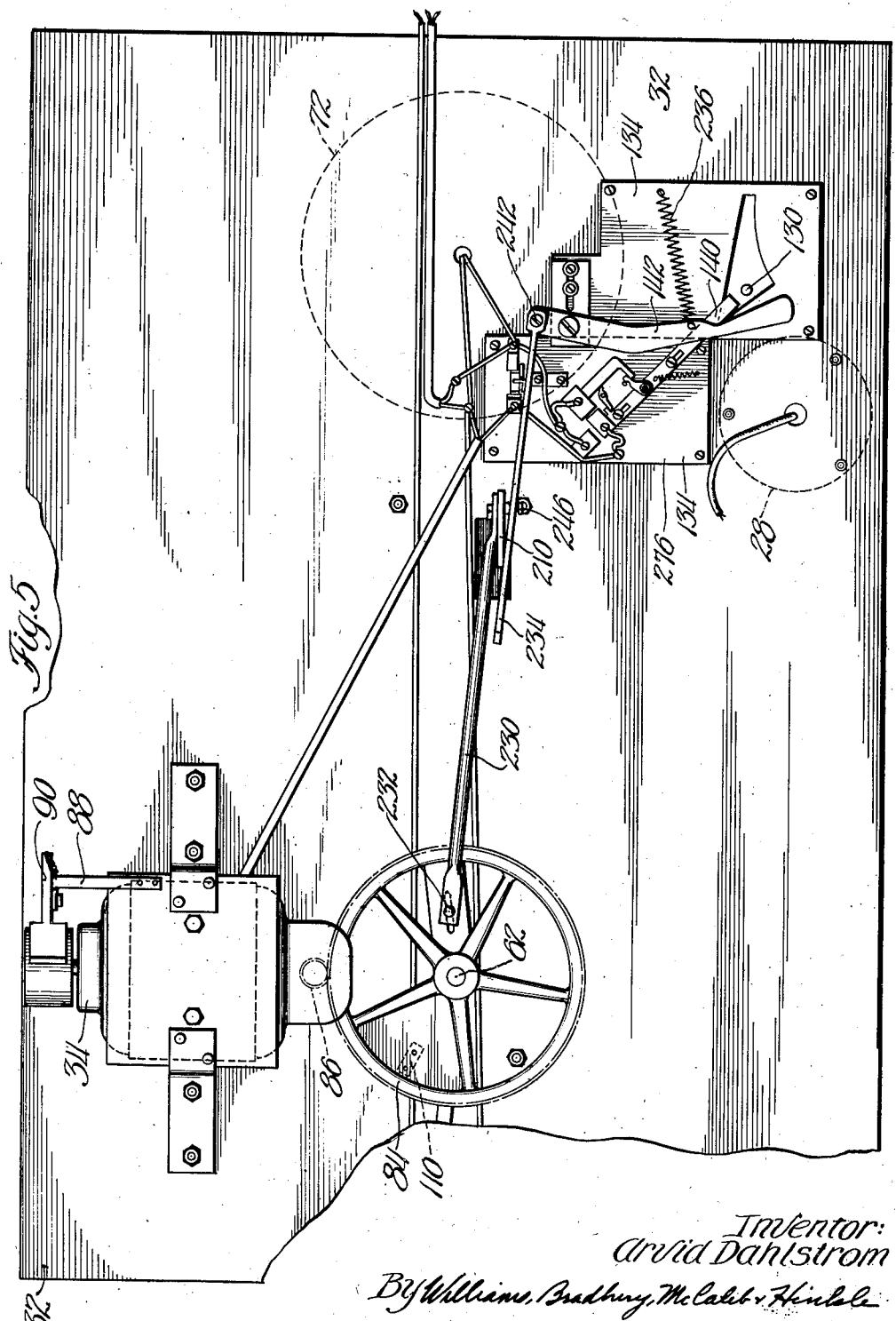

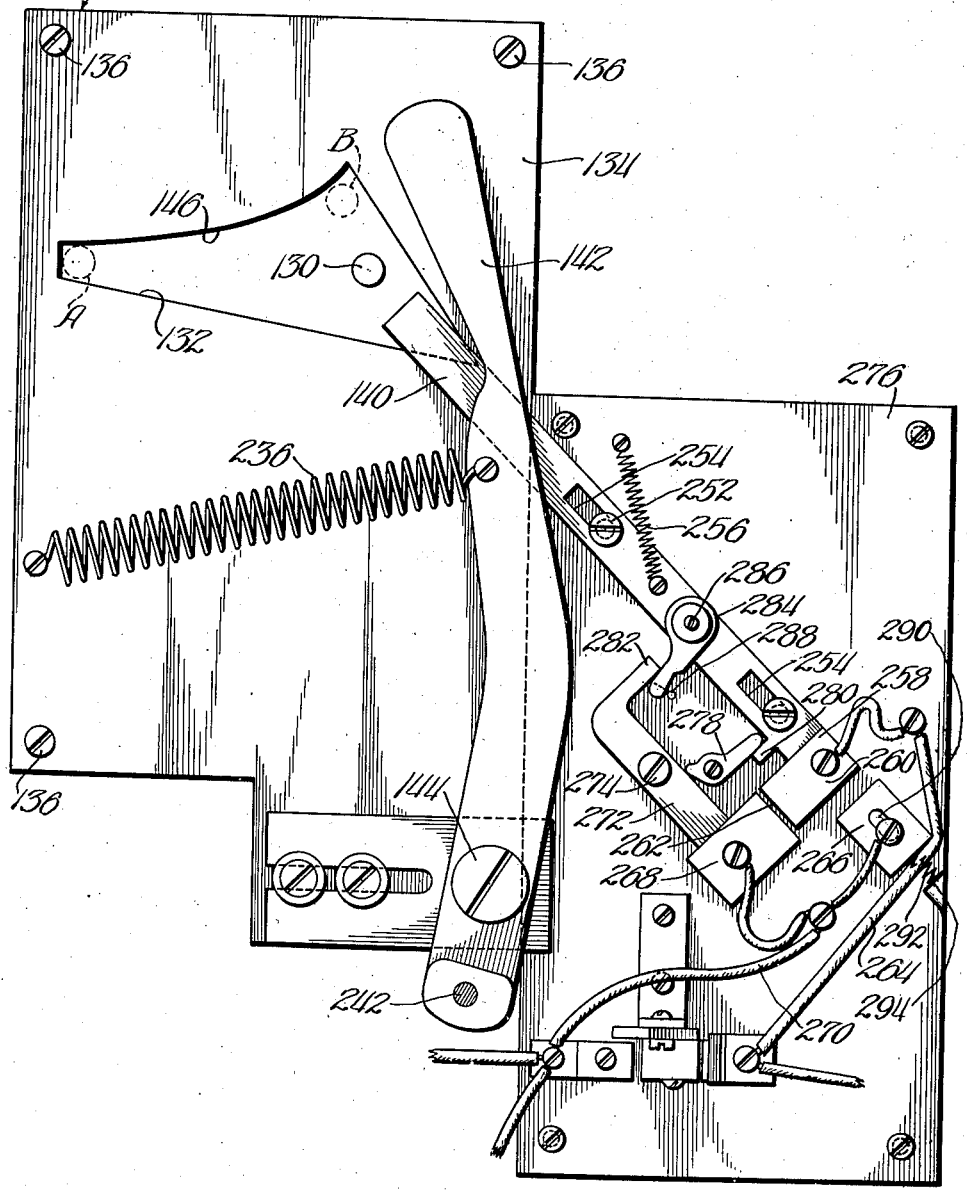

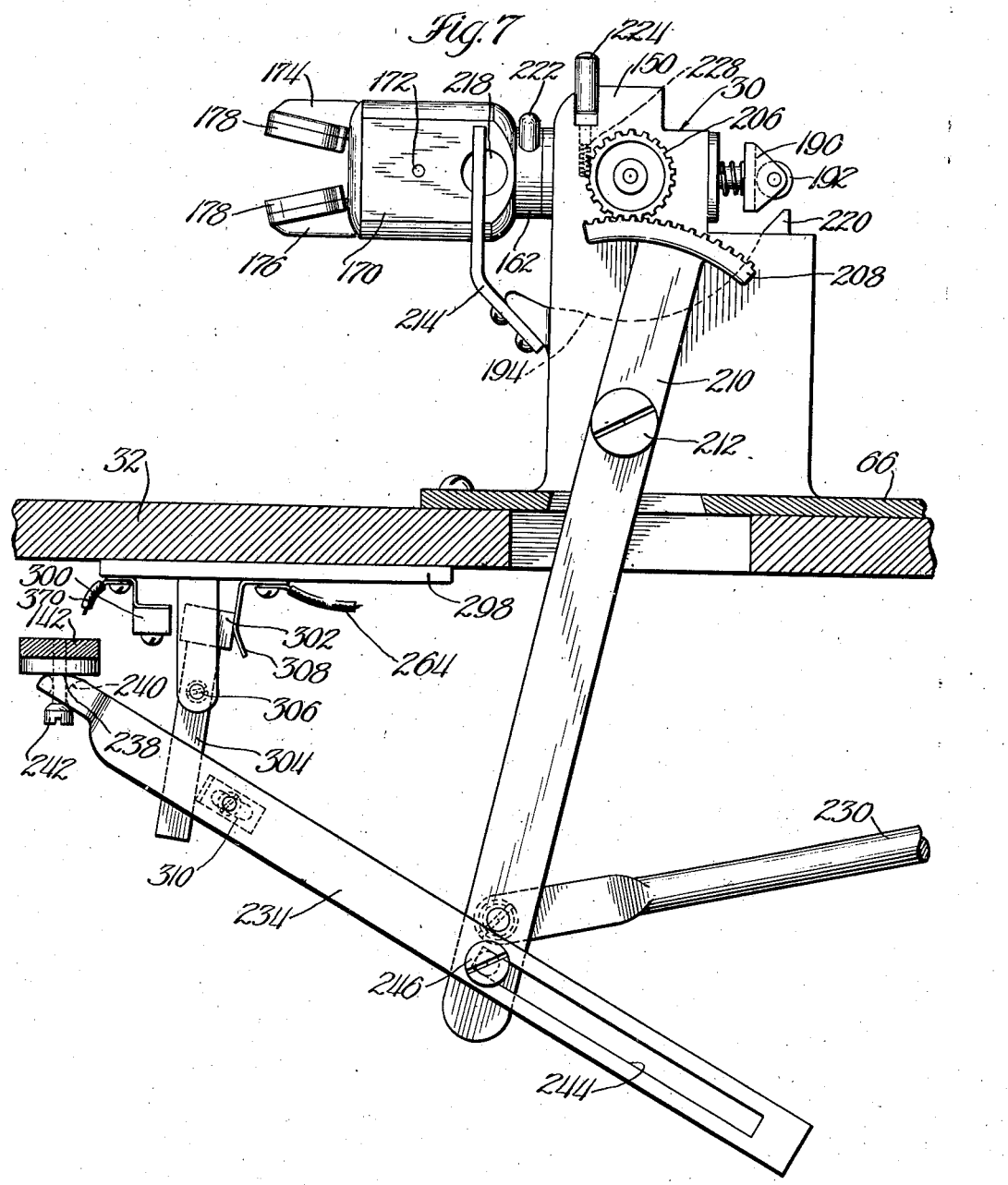

Aug. 14, 1934.   A. DAHLSTROM   1,970,417
AUTOMATIC PHONOGRAPH
Filed Aug. 17, 1929   9 Sheets-Sheet 7
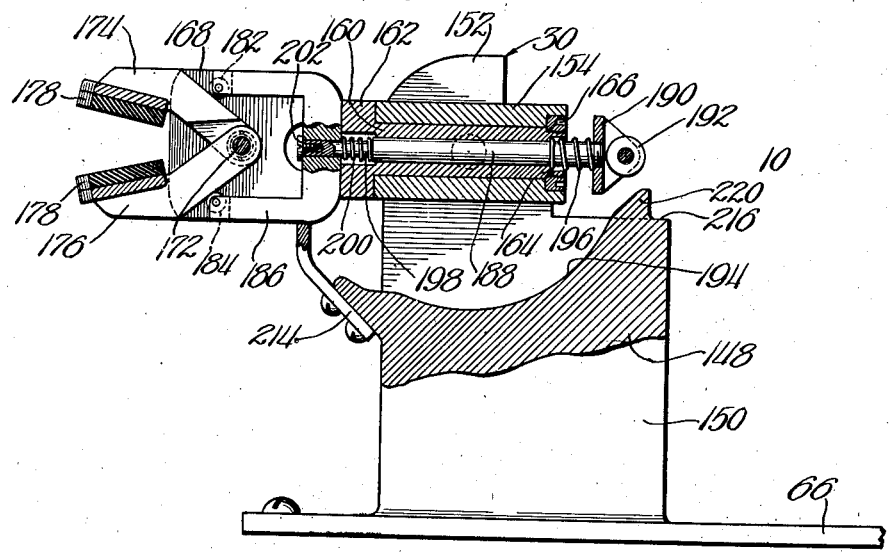
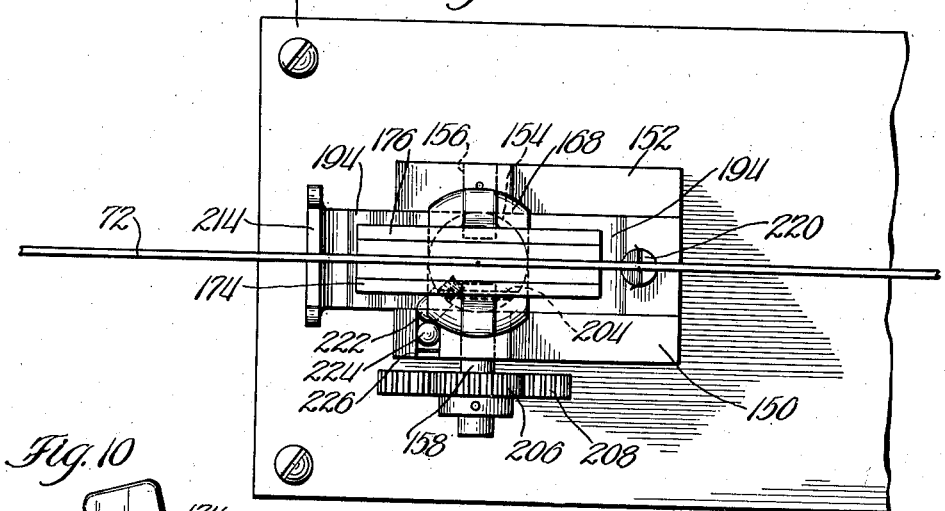
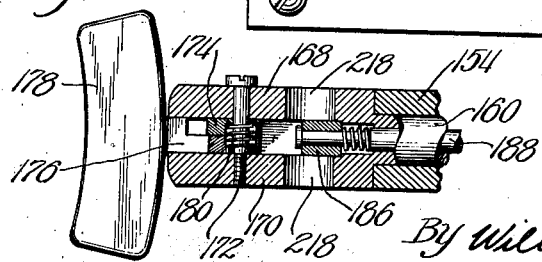
Inventor:
Arvid Dahlstrom
By Williams Bradbury
McCaleb & Hinkle
Attys.

Aug. 14, 1934.                A. DAHLSTROM                 1,970,417
                          AUTOMATIC PHONOGRAPH
                         Filed Aug. 17, 1929        9 Sheets-Sheet 8
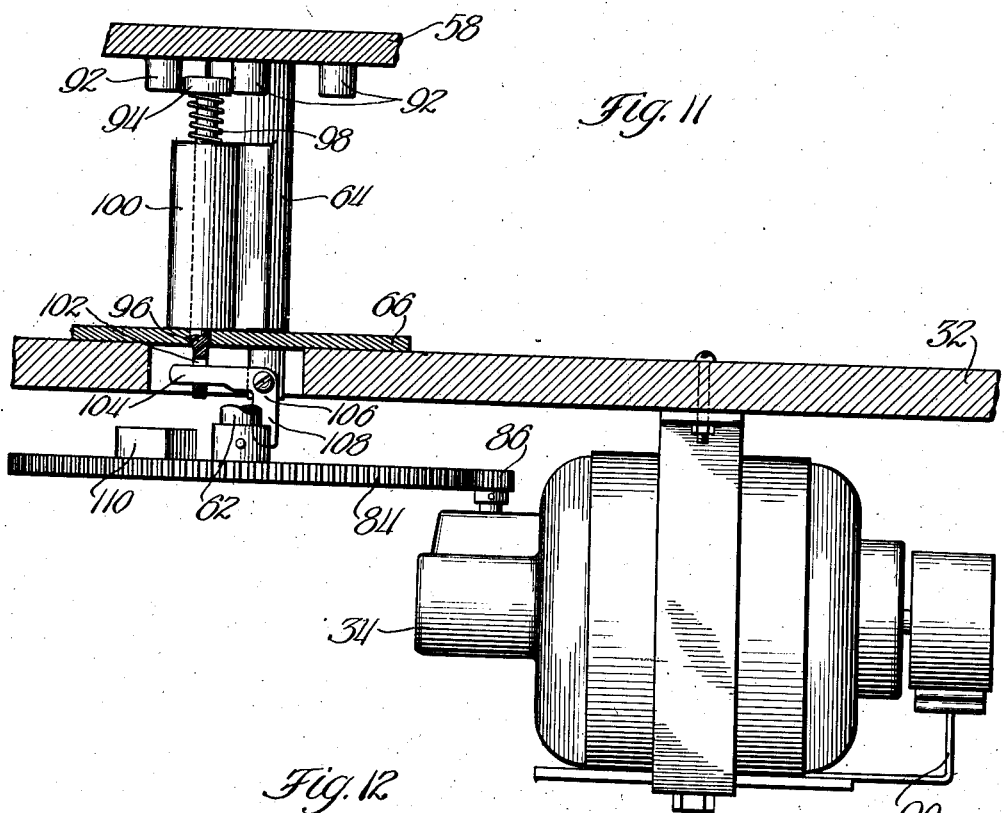
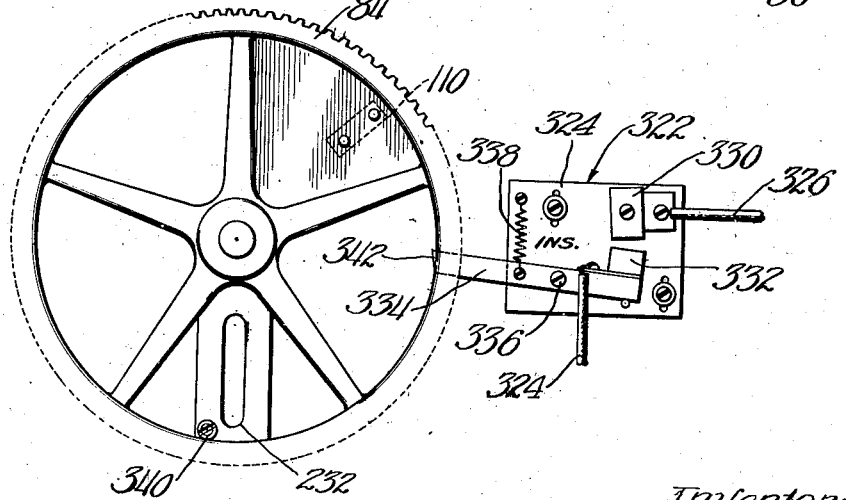
Inventor:
Arvid Dahlstrom
By Williams, Bradbury,
McCaleb & Hinkle
Attys.

Aug. 14, 1934.                A. DAHLSTROM                1,970,417
                           AUTOMATIC PHONOGRAPH
                           Filed Aug. 17, 1929        9 Sheets-Sheet 9
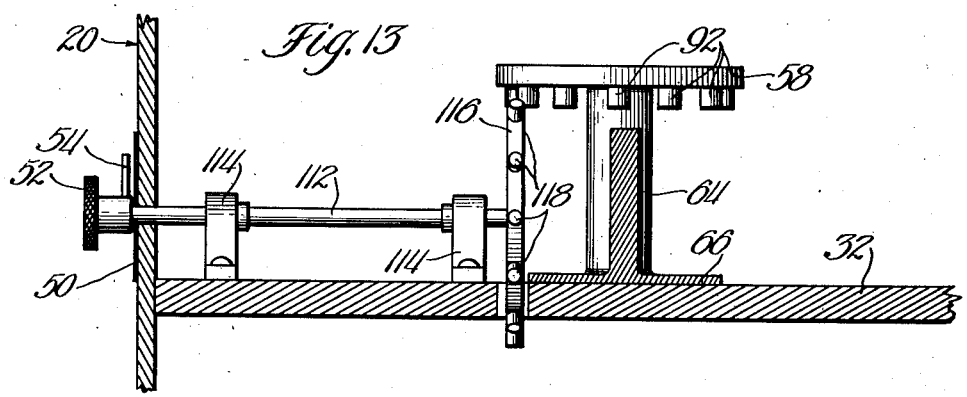
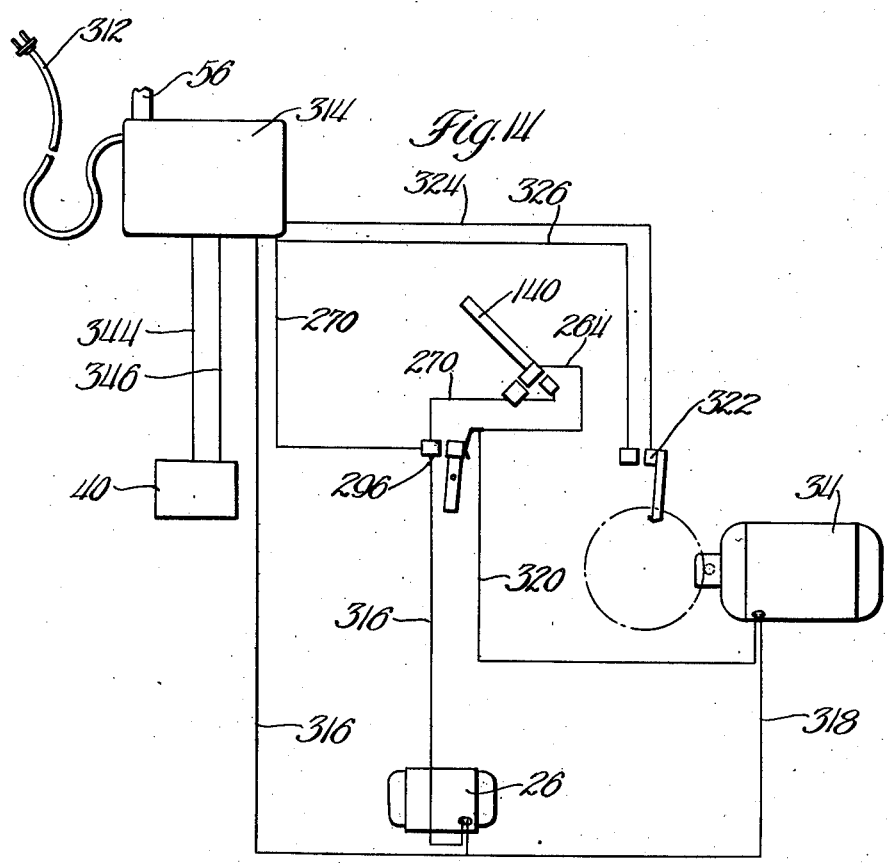
Inventor:
Arvid Dahlstrom
By Williams Bradbury McCaleb & Hinkle
attys.

Patented Aug. 14, 1934

1,970,417

UNITED STATES PATENT OFFICE 1,970,417

AUTOMATIC PHONOGRAPH

Arvid Dahlstrom, Chicago, Ill., assignor of one-third to Frithiof Landberg and one-third to Justus P. Seeburg, both of Chicago, Ill.

Application August 17, 1929, Serial No. 386,516

9 Claims. (Cl. 274—10)

My invention relates to automatic phonographs wherein is provided a magazine for holding several records and automatic means for playing the records in any selected order. In a preferred embodiment of my invention, the phonograph is controlled by coin operated mechanism.

An object of my invention is to provide an automatic phonograph which has few parts, is economical to manufacture, and can be operated for long periods of time without either adjustments or repairs.

Another object of my invention is to provide a new and improved magazine for supporting the records.

Another object is to provide a new and improved carrier mechanism for transferring the records between the magazine and the turntable.

Another object is to provide improved means for applying the electrical pick-up mechanism to the record and for removing the electrical pick-up mechanism from the record after the latter has been played.

Another object is to provide an electrical control circuit and switch therefor which will operate with any style of record.

Another object is to provide a phonograph having selector mechanism whereby the operator may select any record in the magazine which he desires but in which the records will be automatically played in succession when the selector mechanism is not operated.

Other objects and advantages will be apparent as the description proceeds.

In the drawings,

Fig. 1 is a perspective view of a cabinet containing my invention;

Fig. 2 is a sectional elevation illustrating the arrangement of the parts in the cabinet shown in Fig. 1;

Fig. 3 is an enlarged view of the mechanism shown in the upper part of Fig. 2;

Fig. 4 is a top plan view of the mechanism shown in Fig. 3;

Fig. 5 is a bottom plan view of the mechanism shown in Fig. 3;

Fig. 6 is an enlarged view of the mechanism shown at the right of Fig. 5;

Fig. 7 is a view of the carrier mechanism taken on the line 7—7 of Fig. 4;

Fig. 8 is a section on the line 8—8 of Fig. 4;

Fig. 9 is a plan view of the mechanism shown in Fig. 8 but with the carrier in vertical position;

Fig. 10 is a section on the line 10—10 of Fig. 8;

Fig. 11 is a view of the magazine stop mechanism taken on the line 11—11 of Fig. 4;

Fig. 12 is a detailed view showing a control switch and operating mechanism therefor;

Fig. 13 is a view of the selector mechanism; and

Fig. 14 is a diagrammatic view of the electrical circuits forming part of my invention.

Referring to the drawings and particularly to Figs. 1, 2 and 3 thereof, I have illustrated my invention as mounted in a cabinet 20 which may be of any attractive design. The record magazine 22, turntable 24, turntable motor 26, tone arm 28 and carrier mechanism 30, are mounted on a horizontal shelf 32 located substantially midway of the cabinet 20.

Motor 34 for operating the record shifting mechanism, switch mechanism 36, and various operating connections are suspended beneath the shelf 32.

In the preferred form of my invention the tone arm 28 carries an electrical pick-up 38 which may be of any well-known type, and this electrical pick-up is connected with a radio reproducing set 40 located in the lower part of the cabinet 20. The radio reproducing set 40 forms no part of my invention and may be of any of numerous types of radio reproducing mechanism now on the market. The reproducing set 40 operates a loud speaker 42 aligned with a porous screen 44 located in the upper wall of the cabinet and of the kind usually employed as a covering for the mouth of loud speakers.

The front of the cabinet 20 has a glass door 46 through which the operation of my mechanism may be watched. This door may be opened for the purpose of changing the records in the magazine and for inspecting and servicing the mechanism.

At some convenient place on the outside of the cabinet I provide a list 48 giving the names of all records contained in the magazine and opposite the name of each record is placed a suitable number. The outside of the cabinet 20 also carries a dial 50 having numbers corresponding to the numbers contained on the list 48. Projecting from this dial 50 is a knob 52 carrying a pointer 54 which may be turned to any number on the dial to indicate the record in the magazine which is in line with the carrier mechanism for transfer to the turntable. The reference numeral 56 indicates a coin slot into which the coins are dropped to operate the coin control mechanism and thereby set the machine in operation.

My new and improved record magazine comprises a base 58 supported on and in frictional engagement with a disc 60 keyed to a vertical shaft 62 and carried by the upper end of a support 64 preferably cast as an integral part of a metal base 66 firmly secured to the shelf 32. Mounted on the magazine base 58 is a sheet metal spider 68 having slots 70 for receiving and holding the records 72 which may be of any well-known make. The exposed upper edges of the slot 70 are flared outwardly as indicated at 74 to facilitate placing of the records in the magazine. The base 58 has radial extensions 76 located beneath the slots 70 and having upwardly inclined ends 78 which prevent the records from falling out of the slots in the spider 68. The slots 70 are preferably provided with padding 80 and 82 of rubber, felt or other suitable material, which serves as a cushion for the record and prevents injury thereto. These cushions also prevent vibration and rattling of the records in the magazine.

The shaft 62 rotates with the gear wheel 84 which is driven by the motor 34 through pinion 86. The motor 34 may be of any desired make or type but is preferably provided with a suitable brake mechanism 88, here illustrated as a spring pressed brake lever 90, so that the motor will stop almost immediately upon cutting off the supply of electric current to the motor by breaking the motor circuit.

The magazine base 58 is provided with integral depending lugs 92 which coact with stop 94, shown most clearly in Fig. 11, to hold the magazine against rotation during the operation of the machine. The stop 94 is located at the upper end of a pin 96 and is normally held in its upward or magazine engaging position by a coiled spring 98 interposed between the stop 94 and the upper end of the guide 100 formed as an integral part of the base 66.

The pin 96 has an eye 102 at its lower end through which extends one finger 104 of a bell crank lever 106. The other finger 108 of lever 106 is engaged by a cam 110 carried by the gear wheel 84. When the cam 110 contacts with the finger 108 the pin 96 is drawn downwardly against the tension of spring 98 to remove the stop 94 from engagement with the lugs 92 and thereby permit rotation of the magazine either by the rotatable disc 60 or the selector mechanism illustrated in Fig. 13. This selector mechanism comprises a shaft 112 mounted in suitable supports 114 and rotated by means of the knob 52 previously described. The shaft 112 carries a wheel 116 provided with pins 118 intermeshing with the lugs 92 depending from the magazine base 58.

The turntable 24 is of the usual type and is preferably provided with a felt pad on its upper surface to prevent injury to the record when the latter is placed upon the turntable. The turntable is rotated by the motor 26 which may be of any well-known make and which is preferably provided with the usual mechanism for controlling the speed of the turntable.

At one side of the turntable I mount a tubular support 120, upon the upper end of which I pivot the tone arm 28 for movement in a horizontal plane. The outer end of the tone arm is bent laterally as indicated at 122, to provide a pivot for the tubular member 124 which carries the electric pick-up 38. This electric pick-up is provided with the usual set screw 126 for clamping a needle 128. To one end of the tubular member 124 I attach a depending rod 130 which serves as a guide means for lowering the pick-up 38 onto a record and also as a means for lifting the pick-up from the record when the selection recorded thereon has been completed. The pick-up 38 is of such weight relative to the depending rod 130 as to overbalance this rod and press the needle against the groove of the record with just the proper force.

As shown most clearly in Figs. 5 and 6, the rod 130 extends through an opening 132 located in a plate 134 secured to the lower side of the shelf 32 by means of screws 136. In these figures the rod 130 is shown in a position corresponding to the position of the needle when it is about midway of the selection recorded on the record 138 located on the turntable 24. Upon completion of the selection on the record, the rod 130 contacts with the adjacent end of the slide 140 which actuates the electrical control mechanism and results in the arm 142 swinging about its pivot 144, thereby moving the rod 130 to that corner of the opening 132 which is indicated by the reference character A. This movement of the rod 130 raises the needle from the record and swings the tone arm so that the electrical pick-up and adjacent mechanism is clear of the record to permit removal thereof from the turntable.

When the record on the turntable has been changed and everything is ready to start playing the new record, the arm 142 is retracted to the position shown in Fig. 6, and as this retraction occurs the rod 130 follows the retraction of this arm until the rod has moved from the position A to the position indicated by the reference character B, in which position the needle rests on the record at the beginning of the record groove. This action of the rod 130, in following the retraction of the arm 142, results from the overbalancing effect of the electrical pick-up 38 which tends to return the needle 128 to playing position. As the rod 130 moves from the position A to the position B, it slides along the curved edge 146 of the opening 132, which edge is so shaped as to insure an accurate and gentle return of the needle 128 to playing position at the beginning of the record groove.

I will next describe my improved carrier mechanism which I have indicated generally by the reference numeral 30 and which serves to transfer the records between the record magazine and the turntable 24. This carrier mechanism is shown most clearly in Figs. 3, 4, 7, 8, 9 and 10. This carrier mechanism has a supporting frame 148 which may be formed as an integral part of the plate 66 and which has a bifurcated upper end including the spaced sides 150 and 152. The sleeve 154 is supported for vertical swinging movement on pins 156 and 158 supported in the sides 150 and 152, respectively.

The sleeve 154 carries a tubular member 160 having an enlarged head 162 abutting one end of the sleeve and a threaded end 164 adapted to receive an annular nut 166 which retains the tubular member 160 in the sleeve 154. The mounting of the tubular member 160 in the sleeve 154 is such that the tubular member may rotate in the sleeve. As shown most clearly in Fig. 10, the tubular member 160 has projecting arms 168 and 170 through which extends a pin 172 upon which gripping jaws 174 and 176 are pivoted. These jaws are provided with record engaging pads 178 of rubber or other suitable material, for securing a firm grip on the record without injury thereto. A suitable spring 180 tends to maintain the gripping jaws in separated position.

The jaws are moved into record engaging position by means of rollers 182 and 184 mounted in a yoke 186 supported on a stem 188 extending through the tubular member 160 and provided with an end member 190 carrying a cam roll 192 for coaction with the cam suface 194. A spring 196 is confined between the end member 190 and the adjacent end of the tubular member 160 to urge the yoke 186 toward its retracted position. In order to prevent injury to the record, I prefer to provide a yielding connection between the cam roller 192 and the yoke 186, thereby preventing excessive gripping action of the jaws 174 and 176.

The yoke 186 is slidably mounted on the reduced end 198 of the stem 188 and a coil spring 200 normally urges the yoke 186 against the head of a screw 202 threadedly engaging the reduced end 198.

The sleeve 154 is freely pivoted on the pin 156 which is non-rotatably mounted in the side member 152. A key 204 connects the sleeve 154 with one end of the pin 158, to the other end of which is keyed a pinion 206. This pinion is rotated by a segmental gear 208 carried on the end of a lever 210 pivoted at 212 and oscillated by mechanism hereinafter described. Oscillation of the lever 210 results in oscillation of the sleeve 154 and mechanism carried thereby through an angle of 180°, that is, from the position shown in Fig. 8, wherein the yoke 186 is shown as resting on a forked stop 214, to a position in which the arm 170 of the tubular member 160 rests on the shoulder 216 formed by the upper part of the supporting frame 148 shown at the right of Fig. 8. The arm 170 is provided with an opening 218 adapted to receive the projection 220 which defines one end of the cam surface 194. This movement of the carrier mechanism transfers the record from the turntable to the record magazine.

When the record is on the turntable it is located in a horizontal position whereas the records in the magazine are carried in a vertical position. It is therefore necessary to provide means for turning the jaws of the record carrier through an angle of 90° as the record is being transferred from the turntable to the record magazine and vice versa. In order to accomplish this I provide the tubular member 160 with a radially projecting pin 222 and I mount a cooperating pin 224 in the side member 150 of the supporting frame 148. The pin 224 is pivoted in a slot 226 in the side member 150 and is capable of movement toward and from the tubular member 160. A coil spring 228 normally maintains the pin 224 in vertical position adjacent the tubular member 160.

When the record carrier mechanism is swung from the position shown in Figs. 7 and 8 to a position located at an angle of 180° from the position shown, the cam roller 192 engages the cam surface 194 and pushes the yoke 186 forwardly relatively to the jaws 174 and 176, thereby causing the rollers 182 and 184 to press these jaws into gripping position on the record. As the record carrier mechanism, and the record supported thereby, continue to move through the vertical arc of 180°, the pin 222 strikes the vertical pin 224, and the tubular member 160 and mechanism carried thereby are rotated through an angle of 90°, thereby placing the record in a vertical plane. At this time the parts are in the position shown in Fig. 9 and further rotation of the tubular member 160 and mechanism supported thereby is resisted by the frictional resistance between the sleeve 154 and the tubular member 160. Thereupon the pin 224 yields laterally and permits the pin 222 to pass. As soon as the pin 222 has past the pin 224 the latter returns to normal position where it will engage the pin 222 upon the reverse motion of the carrier mechanism and rotate the tubular member 160 and jaws 174 and 176 in the reverse direction.

The lever 210 which operates the carrier mechanism is driven by a link 230 adjustably connected at 232 to the gear wheel 84. A second link 234 connects the lever 210 and link 230 with the arm 142 for shifting the electrical pick-up and tone arm mechanism. As shown most clearly in Fig. 6, the arm 142 is urged in one direction by a spring 236 and is maintained in the retracted position shown in Fig. 6 during the playing of the record by the link 234. The end of the link 234 which is connected with the arm 142 is rounded as indicated at 238 to permit vertical pivotal movement of the link 234 relative to the arm 142. This end of the link 234 is further provided with an eye 240 to receive a pin 242 threadedly or otherwise connected to the arm 142. The opposite end of the link 234 is provided with a slot 244 which receives a pin 246 suitably secured to one end of the lever 210.

As shown most clearly in Fig. 3, different makes of records now in common use have different endings for the record groove. Thus the record 72' is illustrated as having a record groove terminating in a circular portion 248 of considerably smaller diameter than the diameter of the smallest portion of the recording part of the record groove. The record 72" is of a different make and has a record groove terminating in an eccentric portion 250, the smallest radius of which is considerably larger than the radius of the circular portion 248 of the groove in the record 72'.

In order to accommodate my phonograph to both styles of records, I have provided a novel switch mechanism illustrated most clearly in Fig. 6. This switch includes a slide 140 supported on screws 252 extending through slots 254 which determine the range of movement of the slide. A spring 256 normally maintains the slide 140 in the position illustrated in Fig. 6. At one end of the slide 140 is an electrical contact block 258 having one contact face 260 and a second contact face 262. The contact block 258 is connected to one conduit 264 of an electrical circuit. Spaced slightly from the contact faces 260 and 262 are the contact blocks 266 and 268, respectively, connected to a second conduit 270 of the electrical circuit.

The contact block 268 is mounted on one end of a lever 272 pivoted at 274 to a plate 276 fastened to the under side of the shelf 32 by any suitable fastening means. In normal position the lever 272 is engaged by one end of a lever 278, the other end of which engages a stop 280 carried by the slide 140. The end 282 of the lever 272 engages a lever 284 pivoted to the slide 140 at 286 through a frictional connection which permits movement of the lever 284 about its pivot only upon the application of considerable force.

When the machine is used with a record having a groove provided with an eccentric ending similar to the ending 250 of the record 72'', the rod 130 contacts with the adjacent end of the slide 140 when the needle of the electrical pick-up enters the eccentric part of the record groove. This eccentric part of the record groove causes an oscillation of the rod 130 and slide 140 but the movement of the slide 140 is not sufficient to bring the contact block 258 into engagement with the stationary contact block 266. However, upon inward movement of the slide 140 the lever 284 contacts with the stationary pin 288 and is shifted about its pivot 286 on the slide 140. Upon the following outward movement of the slide 140 the lever 284 contacts with the end 282 of the lever 272 and moves this lever about its pivot 274, thereby swinging the contact block 268 into engagement with the face 262 of the contact block 260 and closing the electrical circuit 264, 270 to actuate mechanism for lifting the electrical pick-up from the record and swinging it to one side and to thereafter return the record to the magazine.

When the slide 140 has returned to the position shown in Fig. 6, the stop 280 engages the lever 278 and causes the short end of this lever to engage the lever 272, thereby breaking the electrical contact between the blocks 260 and 268 and returning the parts to the position shown in Fig. 6.

When the machine is used with a record having a groove terminating in a small circular portion corresponding to the circular portion 248 of the record 72'', the slide 140 is moved inwardly until the block 258 engages the block 266, thereby closing the circuit 264, 270 upon the inward movement of the slide. Upon the following outward movement of the slide 140 the contact blocks 258 and 268 are brought into engagement as previously described, but under these circumstances this has no effect upon the operation of the machine.

I have discovered that the various manufacturers making records having grooves provided with circular termini, similar to that indicated at 248 in Fig. 3, provide their terminal circles with slightly different radii, and in order to accommodate all different makes of records I provide the contact 266 with a slot 290 which permits limited movement of this block on its supporting stud. A spring 292 resting against an abutment 294 serves to maintain the block 266 in the position shown in Fig. 6.

I find that it is impossible to provide the block with a sufficient range of movement to accommodate records having the eccentric terminus 250 (Fig. 3) as well as the records having the circular terminus 248. If the block 266 were located close enough to the block 260 to make contact therewith when the needle is located in the eccentric portion 250 of the record groove, this same arrangement of parts would stop the playing of the record 72' before the needle had completely traversed the recording portion of the record groove.

I therefore find it necessary to provide the pivoted block 268 and attendant mechanism where records similar to the record 72'' (Fig. 3) are to be played on the machine.

In parallel with the switch mechanism illustrated in Fig. 6 I provide a second switch mechanism 296 (Figs. 7 and 14). The switch mechanism 296 comprises a base plate 298 secured to the under side of the shelf 32 in any suitable manner and a stationary contact 300 mounted on the plate 298 and connected to the conduit 270. A second contact 302 is movably mounted on a lever 304 pivoted at 306 and is normally held against the contact 300 by spring 308 which also serves as a means for connecting the contact 302 with the conduit 264. While the record is being played the lug 310 mounted on link 234 is in engagement with the lever 304 and holds the contact 302 away from the contact 300 as shown in Fig. 7.

Referring to the electrical diagram shown in Fig. 14, I provide a flexible cord 312 of conventional type for connecting a master switch forming part of the coin control mechanism 314 with an electric light circuit or other suitable source of electrical energy. When a coin is deposited in the slot 56 and passes thence to the coin control mechanism 314, which may be of any one of several suitable and well-known coin control mechanisms, the coin causes the coin control mechanism to close the master switch, thereupon placing the electrical conduits 270, 316 and 318 in communication with the source of electrical energy. This starts the motor 26 which rotates the turntable 24 and this motor continues to rotate until the master switch is again opened. At the time the coin control mechanism closes the master switch the switch 296 is closed and the motor 34 is supplied with current through conduits 270, 320 and 318.

As soon as the record carrier has transferred a record from the magazine to the turntable, the switch 296 is opened and the motor 34 stops. When the needle enters the terminus of the record groove the slide 140 is actuated to close the switch mechanism connecting conduits 264 and 270, and thereupon the motor 34 is placed in communication with the source of electrical energy through conduits 318, 320, 264 and 270. Before the switch controlled by the slide 140 is again opened, the switch 296 closes and maintains the motor 34 in communication with the source of electrical energy.

After the electrical pick-up and tone arm have been moved to one side and the record on the turntable returned to the magazine, the switch 322 closes the circuit formed by the electrical conduits 324 and 326 to open the master switch associated with the coin control mechanism 314.

As a matter of convenience I have referred to the device 40 as a radio receiving set. This device may be a complete radio receiving set capable of operation independently of the phonograph mechanism and supplied with current from storage batteries, electric light circuit, or other suitable source of supply. In a preferred embodiment of my invention the device 40 is not a complete radio receiving set but is merely a conventional amplifying mechanism for increasing the current delivered by the electrical pick-up 38 before it is supplied to the loud speaker 42.

As illustrated in Fig. 14, this amplifying device 40 is connected by means of wires 344 and 346 with the master switch associated with the coin controlled mechanism 314 and receives its supply of current from the same source as do the motors 26 and 34. When the master switch is closed the amplifying device 40 is connected with the light circuit or other source of supply through the flexible conduit 312, and when the master switch is open the device 40 is disconnected from the source of electrical supply.

Where tubes of the heater type are used in the amplifying device 40, it is necessary that these tubes be given a suitable period for warming up before the reproduction of the record begins, and in my invention this heating period occurs while the record is being transferred from the record magazine to the turntable and I so time this operation that it will afford the necessary heating period for the tubes associated with the amplifying device 40.

The switch 322 is illustrated in Fig. 12 and comprises a plate 328 secured to the under side of shelf 32 and stationary and movable contacts 330 and 332, respectively. The movable contact 332 is mounted on a lever 334 pivoted at 336 and normally held in the position shown by a spring 338. When the lever 334 is contacted by the pin 340 carried by the gear wheel 84, the switch 322 is momentarily closed. The cam engaging end of lever 334 is beveled as indicated at 342 so that the engagement between this end of lever 334 and the pin 340 will be broken almost instantaneously as it is necessary that the pin 340 be out of contact with the lever 334 and the switch 322 in open position, shown in Fig. 12, by the time the gear wheel 84 ceases to rotate due to the cutting off of the supply of current to the motor 34.

The operation of my invention is as follows:
When the master switch associated with the coin control mechanism 314 is open and the machine is at rest the lug 110 (Fig. 11) is beneath the arm 108 of the lever 106 and the stop 94 is in lower or retracted position, thus permitting free rotation of the magazine base 58 and records supported thereon. At this time the carrier mechanism is located in the opposite position from that shown in Fig. 7 and the links 230 and 234 have moved to a position toward the right of said figure to permit the spring 308 to hold the contacts 300 and 302 in engagement and thereby connect the motor 34 with the master switch. The spring 236 is holding the arm 142 in a position adjacent the left-hand side of Fig. 6, thereby maintaining the rod 130 in the dotted line position indicated at A, so that the electrical pick-up 38 and the tone arm 28 are located at one side of the turntable 24. The switch 322 (Figs. 12 and 14) is open.

With these parts in this position the operator inspects the list 48 and selects a record which he desires to have played. He thereupon rotates the knob 52 until the pointer 54 indicates a number on the dial 50 corresponding to the number on the list 48 opposite the name of the record selected. This rotation of the knob 52 turns the record magazine until the selected record is placed in position to be transferred to the turntable 24 when the machine is started. The operator then drops a suitable coin into the slot 56 and this coin operates the coin control mechanism 314 to close the master switch associated therewith, whereupon both motors 26 and 34 are placed in communication with the source of electrical energy and start to rotate. The motor 34 drives gear wheel 84, shaft 62 an disc 60 which in turn rotates the magazine resting thereon until the cam 110 passes from beneath the arm 108 of lever 106, whereupon stop 94 moves upwardly to the position shown in Fig. 11 where it rests between adjacent lugs 92, thereupon stopping further rotation of the record magazine and placing the selected record in position for transfer to the turntable 24.

Continued rotation of gear wheel 84 swings lever 210 about its pivot through the means of connecting link 230 and this swinging movement of the lever 210 operates the carrier mechanism to transfer the selected record from the magazine to the turntable. This swinging movement of the lever 210 causes gear 208 to rotate pinion 206 and sleeve 154 through an angle of 180°. As the sleeve 154 swings on its pivots 156 and 158 the cam roller 192 is brought into engagement with the cam surface 194, thereby moving the yoke 186 so as to cause the jaws 174 and 176 to grip the record in the magazine. Continued rotation of the sleeve 154 about its pivots lifts the record from the magazine and carries it toward the turntable.

During this transfer of the record the pin 222 carried by the tubular member 162 engages the vertical pin 224 and is rotated thereby through an angle of 90°, at the same time rotating the jaws 174, 176 through a like angle and turning the record from a vertical to a horizontal position. As the record is placed on the turntable the cam roller 192 passes beyond the cam surface 194 and the jaws 174, 176 release the record which thereupon rotates with the turntable. At this time the carrier mechanism is in the position shown in Fig. 8.

Further rotation of the gear wheel 84 advances the link 234 toward the left, as viewed in Fig. 7, and moves the arm 142 toward the right, as viewed in Fig. 6. This movement of the arm 142 permits the rod 130 to move from the position A to the position B, during which movement the electrical pick-up 38 is moved over the record and lowered into position at the beginning of the record groove. When the coin was inserted and caused the coin controlled mechanism to close the master switch, the amplifying device 40 was connected with a source of electrical current, and by the time the electrical pick-up 38 has been thus lowered into position the tubes associated with the amplifying device have reached an operating temperature. Continued rotation of the turntable 24 causes the electrical pick-up 38 to traverse the record groove and the selection recorded on the record is reproduced.

When the needle has traversed the record groove and reaches the circular or eccentric terminus of the groove, as the case may be, the rod 130 contacts with the slide 140 and closes the switch shown in Fig. 6, thereby starting motor 34. This moves the links 230 and 234 (Fig. 7) toward the right of this figure, thereby permitting closing of the contacts 300 and 302 before the switch mechanism shown in Fig. 6 breaks contact.

Continued rotation of motor 34 and gear wheel 84 draws link 230 further toward the right of Fig. 7, thereby permitting spring 236 to move arm 142 toward the left in Fig. 6 and move the rod 130 to the dotted line position A. This movement of the rod 130 lifts the needle from the record and swings the electrical pick-up and tone arm to one side of the turntable. Thereafter the lever 210 (Fig. 7) is swung about its pivot and causes the jaws 174, 176 to grip the record and lift it from the turntable. As the record and carrier mechanism are swung from a position adjacent the turntable to a position adjacent the record magazine, the pin 222 engages the vertical pin 224 and swings the record from a horizontal to a vertical position. Continued movement of the carrier places the record in its proper slot in the record magazine and thereupon the cam roller 192 passes beyond the end of the cam surface 194 and permits the jaws 174, 176 to release the record. Thereafter the carrier mechanism moves until it comes to rest with the side member 170 resting on the shoulder 216, in which position the jaws 174, 176 are clear of the records in the record magazine so that the magazine can be rotated.

Thereafter cam 110 on gear wheel 84 (Fig. 11) lifts arm 108 of the lever 107, thereby withdrawing stop 94 from between the lugs 92 on the magazine base 58, thereby permitting the magazine to rotate with its supporting disc 60. Pin 340 on gear wheel 84 next contacts with lever 334 and closes switch 322, thereby actuating the control mechanism to open the master switch 314 which cuts off the supply of current to the motors 26 and 34 and also to the amplifying device 40. The brake 90 associated with the motor 34 causes this motor to stop promptly after the master switch is opened but before the gear wheel 84 has ceased to rotate the pin 340 has moved out of contact with the lever 334 and the spring 338 has broken contact between the blocks 330 and 332 of the switch 322.

The entire mechanism is now at rest and will not again operate until another coin is inserted. I preferably use a coin controlled mechanism which will receive several coins at the same time and which will continue to operate the machine until the supply of coins deposited in the apparatus is exhausted.

It should be noted that the cam 110 is made of such length that each time the magazine is stopped and then started again the record magazine is rotated through an angle corresponding to the angle between adjacent records in the magazine so that if the selector mechanism is not used the machine will automatically play the records in succession. Each time a record is returned to the magazine by the carrier mechanism the record is placed in the magazine in exactly the same position which it formerly occupied, that is, it is located in the same slot and the sides of the record are not reversed. The arrangement of records in the magazine therefore always corresponds with the order of record titles appearing on the list 48.

My invention is capable of wide variation within equivalent limits and I contemplate such variation as may be desirable or useful in the particular adaptation of the invention shown or in its adaptation to other apparatus. I do not restrict myself in any unessential particulars and what I claim and desire to secure by Letters Patent is:

1. In mechanism of the class described, a record turntable, means for rotating said turntable, a tone arm pivoted for movement in a plane parallel to said turntable, reproducing mechanism pivoted on said tone arm for movement in a plane perpendicular to said turntable, means for lifting said reproducing mechanism from said turntable and moving said mechanism to one side thereof, and a cam shaped slot for guiding the return of said tone arm and reproducing mechanism to record playing position upon the release of said last-named means.

2. In an automatic phonograph of the class described, a turntable, reproducing means associated therewith, a magazine for holding records, carrier mechanism for transferring records from said magazine to said turntable, a rotatable disc supporting and frictionally driving said magazine, means for rotating said disc, said magazine adapted to rotate with said disc, a stop for limiting rotation of said magazine, and means for rendering said stop inactive.

3. In a phonograph of the class described, a magazine comprising a cast metal base having a circular bottom surface surrounded by a plurality of depending lugs, a sheet metal frame mounted on said base, said frame providing means for holding a plurality of records, driving means engaging said surface, and separate driving means engaging said lugs.

4. In a phonograph of the class described, a record turntable, reproducing mechanism, a magazine for holding a plurality of records, carrier mechanism for transferring records from said magazine to said turntable, said carrier mechanism including means for gripping said record and controlling means for limiting the pressure with which said first named means grip said record, and mechanism for operating said turntable and carrier mechanism.

5. In apparatus of the class described, a record turntable, reproducing mechanism, a magazine for holding a plurality of records, carrier mechanism for transferring records from said magazine to said turntable, said carrier mechanism comprising jaws for gripping a record, means to move said jaws to record gripping position, and yielding means for controlling the pressure exerted by said jaws, and power operated mechanism for driving said turntable and said carrier mechanism.

6. In an automatic phonograph, a record turntable, means for rotating said turntable, reproducing mechanism, a record magazine, and carrier means for transferring records from said magazine to said turntable, said carrier means comprising a support, a member pivotally mounted on said support, a second member rotatably carried by said pivoted member, jaws carried by said rotatable member, a yoke for moving said jaws to record gripping position, stops provided by said support for limiting movement of said pivoted member, cooperating pins carried by said rotatable member and said support for turning said rotatable member, and means for moving said yoke to jaw closing position, said means including a cam surface provided by said support.

7. In an automatic phonograph, a record turntable, a motor for driving said turntable, reproducing mechanism, and means for rendering said motor inoperative, said last-named means including a switch operated by the reproducing mechanism and comprising a slide having an electrical contact thereon, a second contact normally spaced from said first-mentioned contact and movable therewith through a limited distance, a lever adjacent said slide, a third contact mounted on said lever, and means carried by said slide for rocking said lever to bring the contact carried thereby into engagement with the contact mounted on said slide.

8. An automatic phonograph comprising a record turntable, a record magazine, carrier mechanism for transferring records from said magazine to said turntable, a motor for driving said turntable, reproducing mechanism adapted to be brought into and out of engagement with said record, an arm for moving said reproducing mechanism away from said record, a link for operating said arm, a lever for operating said carrier mechanism, a second link connecting said lever and first-named link with a crank, and a second motor for driving said crank.

9. In an automatic phonograph, a record turntable, reproducing mechanism adapted to be moved into and out of engagement with a record on said turntable, a record magazine, carrier mechanism for transferring records from said magazine to said turntable and returning them to said magazine, means, including a link, for controlling the position of said reproducing mechanism, a pivoted lever for operating said carrier mechanism, a second link connecting said lever and first-named link with a crank, a wheel for driving said crank, means driven by said wheel for moving said magazine, stop means for limiting movement of said magazine, means controlled from said wheel for rendering said stop inactive, and driving means for said turntable and said wheel.

ARVID DAHLSTROM.